United States Patent [19]

Edwards, III et al.

[11] Patent Number: 5,240,741
[45] Date of Patent: Aug. 31, 1993

[54] INHIBITING COKE FORMATION BY COATING GAS TURBINE ELEMENTS WITH TUNGSTEN DISULFIDE

[75] Inventors: William H. Edwards, III, Port St. Lucie; John A. Harris, III; Steven M. Kessell, both of West Palm Beach, all of Fla.

[73] Assignee: United Technologies Corporation, Hartford, Conn.

[21] Appl. No.: 811,770

[22] Filed: Dec. 20, 1991

[51] Int. Cl.⁵ .................................................. B05D 1/12
[52] U.S. Cl. ..................................... 427/180; 427/190; 427/427
[58] Field of Search ....................... 727/180, 190, 427

[56] References Cited

U.S. PATENT DOCUMENTS

| | | | |
|---|---|---|---|
| 3,632,368 | 11/1970 | Nelson | 427/190 |
| 3,793,195 | 2/1974 | Betts | 428/469 |
| 3,968,302 | 7/1976 | Brown | 428/470 |
| 4,297,246 | 10/1981 | Cairns et al. | 428/469 |
| 4,316,921 | 2/1982 | Taylor et al. | 427/249 |
| 4,399,168 | 8/1983 | Kullander et al. | 428/698 |
| 4,554,897 | 11/1985 | Yamada et al. | 428/472 |

*Primary Examiner*—Shrive Beck
*Assistant Examiner*—David M. Maiorana
*Attorney, Agent, or Firm*—Herbert W. Mylius

[57] ABSTRACT

A method is taught for protecting fuel contacting surfaces of a gas turbine engine from carbon deposition by the application of a coating of tungsten disulfide.

11 Claims, No Drawings

INHIBITING COKE FORMATION BY COATING GAS TURBINE ELEMENTS WITH TUNGSTEN DISULFIDE

BACKGROUND OF THE INVENTION

1. Field of the Invention

This invention relates to methods for preventing the deposition of carbon, or coke, on fuel wetted surfaces located in high temperature zones of gas turbine engines. Coke deposition is an undesirable side effect caused by the catalytic-thermal degradation of hydrocarbon fuels during their consumption in gas turbine engines. Such deposition leads to performance loss, reduced heat transfer efficiencies, increased pressure drops, costly decoking procedures, and increased rates of material corrosion and erosion. The metals most prone to catalyze coke deposition are those metals commonly found in the alloys utilized in components exposed to high temperature, fuel wetted environments of gas turbine engines, typically found in jet engines in the combustor and afterburner fuel delivery systems.

2. Description of the Prior Art

Carburization, or the formation of coke deposits, has been noted particularly in high temperature environments where carbon containing fluids come in contact with metals or metal alloys. Exemplary of such environments are high temperature reactors, such as refinery crackers, thermal crackers, distillation units for petroleum feedstock, and gas turbine components. Conventional methods used to reduce coke formation and carburization in steam cracking operations involve the steam pre-treatment of the surface to promote formation of a protective oxide skin. The surface may then be further protected by the deposition of a high temperature, stable, non-volatile metal oxide on the pre-oxidized substrate surface by thermal decomposition from the vapor phase of a volatile compound of the metal.

While the chemical vapor deposition of an alkoxysilane has been demonstrated to reduce the rate of coke formation in the pyrolysis section of an ethylene steam cracker by formation of an amorphous silica film on the internal surfaces of high alloy steel tubing at 700° to 800° C., no one to date has solved the problem of coke deposition on fuel contacting hardware in gas turbine engines.

The use of tungsten disulfide as a dry lubricant for metal surfaces is known. However, no application of this material has been made, to our knowledge, for the purpose of reducing carburization or coking on metal surfaces.

SUMMARY OF THE INVENTION

The present invention relates to a method for reducing coke formation on fuel contacting components of gas turbines, such as in the combustor and afterburner of a jet engine. A thermally resistant barrier is applied to prevent contact of the fuel with catalytic agents such as iron, nickel, and chromium, contained in the base metals from which fuel contacting components are fashioned. Specifically, the fuel contacting components are coated with a thin, high temperature resistant, mechanically stable, molecularly bonded tungsten disulfide layer, which reduces the rate and severity of coke deposition on the surfaces.

DESCRIPTION OF THE PREFERRED EMBODIMENTS

Coke deposition has been found to be an undesirable side effect caused by the thermally accelerated degradation of hydrocarbon fuels during their use for power generation in gas turbine engines. It is a particular goal of the present invention to reduce the deposition of carbon on fuel contacting components of gas turbine engines such as fuel nozzles, fuel lines, and augmentor spray manifolds, and such other areas as lubrication systems and breather tubes.

It is known that hydrocarbon fuels may degrade either under high temperature conditions, i.e. thermally, or under lower temperature conditions in the presence of a catalytic material. One approach to the problem in the past has been to regulate the quality of the fuel consumed, so as to limit degradation thereof. However, as engines are required to run faster and hotter to achieve greater output, the ability of present day hydrocarbon fuels to provide the required performance without coking is lessened. Further, since many of the metals required for the construction of higher temperature gas turbine engines are catalytic to the degradation of hydrocarbon fuels, coke formation has become of greater concern. Accordingly, a method has been sought to increase the temperature at which engines may operate without degradation of the fuel and deposition of coke. It has now been found that this may be achieved by the application of a suitable coating to fuel contacting surfaces to act as a barrier between the hydrocarbon and the catalytic elements in the surfaces. Certain high temperature resistant materials either do not participate in the mechanism of catalytic-thermal deposition of coke, or participate to a much lesser degree than such metals as iron, nickel, chromium, or their alloys. It has also been noted in the course of our investigations that certain materials actually enhance the degradation of carbon containing fuels. These same materials, when exposed to elevated temperatures, cause any gums and/or varnishes which do form to completely burn away. A suitable coating has been found to comprise a thin layer of tungsten disulfide, $WS_2$, in lamellar form, which is free of organic constituents such as binders, and is provided as a dry, flowing powder. This powder may be applied to the surface in the same fashion as it would be applied for use as a dry film lubricant, using an air blast gun to provide a monomolecular layer of from about 0.000010 inches to about 0.000030 inches, and preferably from about 0.000015 inches to about 0.000020 inches in thickness. Such a coating is stable in hydrocarbon fuels, and is thermally stable at temperatures from about minus 327° F. to about 900° F., in air. Sub-coats or bond coats may be applied if necessary to achieve an adherent bonding to the substrate. Conventional cleaning and preparatory steps should be taken prior to deposition of the coating to enhance adherence.

A number of primary factors were identified which relate to the deposition of hydrocarbons in gas turbines. These include fuel composition, temperature, time, the availability of oxygen, and the presence of catalytic materials in the surface of the fuel handling components. For an operating gas turbine, each of these factors has an almost infinite number of possible values, with the exception of the composition of the fuel contacting elements of the gas turbine engine itself. Accordingly, the present invention is directed to control of the surface composition of the fuel handling components of the gas turbine engine, and specifically to the provision of tungsten disulfide surface coatings thereupon to reduce the deposition of carbon, or coking.

Alloys used in hydrocarbon fuel burning engines commonly contain metals which catalyze coke deposition, such as iron, nickel, and chromium. Thermal degradation occurs as a matter of course, and there are periods during the operation of turbine engines when fuel flow is very low, or as in the case of military engine augmentor plumbing, i.e. fuel feed tubes and spray manifolds, there is no fuel flow at all. During such periods, the temperature of the residual fuel left in the plumbing can rise, causing increased coke deposition from accelerated fuel degradation reactions and thermal cracking. The contributions of various metallic hardware surfaces to coke deposition were evaluated with a goal of determining the best method for reducing the formation and adherence of coke. It has been learned that coking may be reduced by application of a surface layer of an anti-coking material to the surfaces of the fuel handling components of a gas turbine engine. Such anti-coking materials may be of a nature to either reduce or inhibit the tendency of coke to adhere to the surface, or, conversely, to enhance the catalysis of the surface and increase the reactivity such that any gums and varnishes which tend to form are caused to react further, breaking them down to gaseous products which are eliminated.

Surfaces which may be coated for prevention of coking include fuel lines, fuel nozzles, augmentor spray manifolds, and other hydrocarbon contacting surfaces of gas turbines, such as lubrication systems and breather tubes. Such surfaces may comprises such materials as titanium and titanium alloys, aluminum, stainless steels, and nickel base alloys such as Inconel nickel base alloys and Waspaloy nickel base alloy. In addition, the present invention may be suitable for prevention of coking one other surfaces, such as copper, zirconium, tantalum, chromium, cobalt, and iron, for example. While the examples which follow relate to coating components fashioned of Waspaloy nickel base alloy or Inconel nickel base alloys, it is to be understood that the present invention is not to be limited thereto.

To evaluate the effectiveness of experimental coatings in reducing the tendency of jet fuel to form coke deposits on a metal substrate, Waspaloy nickel base alloy samples were utilized under conditions simulating the operational conditions to be anticipated in a high performance military aircraft engine. In a typical military flight scenario, fuel is heated as it travels through the fuel plumbing on its way to the combustor and/or augmentor of the engine to be burned. Generally, the fuel flow rate is sufficiently high to limit the effect of those factors which relate to coking. However, during flight, when the augmentor is shut off, spray manifold temperatures in the afterburner section rise considerably, going from about 350° F. to about 1000° F. or higher in some areas. Fuel left in the spray manifold in these areas boils, and with no place to flow, degrades rapidly to form insoluble, sticky, gum-like varnishes, which after a number of cycles results in formation of coke deposits. A similar scenario occurs in the engine combustor fuel nozzles at engine shutdown. However, since the augmentor is cycled on and off much more frequently than the engine is, it is to be expected that the augmentor fuel plumbing would have a higher coking rate than the combustor fuel nozzles. Accordingly, the conditions encountered at the spray manifold of the augmentor section were selected as representative of conditions which result in coke deposition.

EXAMPLE 1

Coatings of silica, alumina, and tungsten disulfide were initially evaluated for effectiveness against carbon deposition in the liquid phase, i.e. in flowing fuel with no boiling. Silica coatings were applied by dipping in a solution containing 41.3 tetramethylorthosilicate (TMOS), 38.9% methanol, and 19.8% distilled water. The specimen surface was first preoxidized at 1000° F. The dip was followed by air drying, and repeated four times, followed by firing at 1000° F. Sol gel alumina coatings were applied in a manner similar to the TMOS silica, but in two sets of four dips each with firings at 1112° F. in vacuum ($10^{-5}$ torr) for 5 hours between dip sets. The tungsten disulfide coatings were applied through an air blast gun at 120 psi, with the gun positioned 10 to 12 inches from the surface. The reductions in coke reduction achieved are set forth in Table I. These are averages of duplicate results as compared to uncoated specimens, subjected to identical conditions.

TABLE I

| DEPOSIT REDUCTION | |
|---|---|
| Coating Type | Reduction |
| None | — |
| Silica | 28% |
| Alumina | 18% |
| Tungsten disulfide | 5% |

EXAMPLE 2

A second test was conducted using the coked test specimens from the first experiment. In this experiment the ability of each coating to rapidly catalyze the gasification of the deposited coke was evaluated. The coked specimens from Example 1, along with the uncoated blank specimens, were placed in a furnace at 1050° F. for two hours. The oxygen content of the atmosphere in the furnace was lowered with nitrogen to simulate the reduced oxygen environment inside a spray manifold. The results are set forth in Table II. The uncoated specimens showed no observable reduction in coke deposits. The tungsten disulfide coating, however, suffered some coating loss, apparently due to exceeding its upper temperature capability in air. No coating loss was noted for the other coatings.

TABLE II

| DEPOSIT LOSS | |
|---|---|
| Coating Type | Reduction |
| None | — |
| Silica | 100% |
| Alumina | 90% |
| Tungsten disulfide | 100% |

EXAMPLE 3

A Jet Fuel Thermal Oxidation Tester (JFTOT) was used to evaluate various tubes of Waspaloy nickel base alloy and Inconel 625 nickel base alloy under test conditions chosen to simulate, as closely as possible, the conditions at spray manifold locations of a military jet engine after augmentor cancellation. These conditions were as follows:

| | |
|---|---|
| Temperature: | 575° F. |

-continued

| | |
|---|---|
| Fuel flow: | 2 ml/minute |
| Pressure: | 400 psi, in air |
| Flow mode: | Recirculate |
| Time: | 8 hours |

Three sets of Waspaloy nickel base alloy oxidation test tubes were fabricated having surface finishes of 16, 32, and 63 microinch (u"), respectively, as well as one set of Inconel 625 nickel base alloy tubes with a 32 microinch finish. Coatings of silica ($SiO_2$), gold (Au), and tungsten disulfide ($WS_2$) were applied to sections of the test tubes for evaluation.

The silica coatings were applied by two different techniques. The first was by a conventional sputtering method, and the second by dipping the test tubes in a solution containing 25 grams of tetramethylorthosilicate (TMOS), 30 ml methanol, 12 ml distilled water. The dip was followed by air drying, and then repeated four times. The coating was then heated at 150° F. to 200° F. for 30 minutes.

The tungsten disulfide coating was applied through an air blast gun at 120 psi, with the gun positioned 10 to 12 inches from the surface. Tungsten disulfide does not adhere to itself, and therefore only a monolayer thickness of about 0.00002 inches or less was obtained. Alternatively, a thin layer of tungsten disulfide may be applied by mechanically brushing on a preoxidized Waspaloy nickel base alloy surface, with subsequent heating to about 800° F. to produce an adherent layer.

The gold coating was applied to the tube surface from a conventional gold plating bath, with care taken to insure complete coverage with no areas uncoated.

The fuel used for the testing was JP-4 aviation fuel, taken from a single source maintained at constant temperature.

Initially, the Jet Fuel Thermal Oxidation Tester was set up with a quartz heater tube housing to allow the use of a Remote Probe Tube Deposit Rater, which monitored, via strip chart recorder, the decrease in reflected light from the tube surface as carbon deposits are formed. The probe was aligned at the heater tube hot spot as determined by a thermocouple inserted in the longitudinal hole of the heater tube. The Rater provided an estimation of time to the beginning of carbon deposition, and the rate of formation of the deposit. Since this device is an optical sensor, and coke deposit density is variable, no quantitative weight conversions were possible for this test. However, calculations of the percentage change in the rate of deposit were made by comparing the slopes of the appropriate uncoated blank test tubes to those of the coated tubes.

Tests were conducted upon Waspaloy nickel base alloy 16 microinch, 32 microinch, and 63 microinch uncoated tubes, and the coated tubes. Test results are shown in Table III, below.

TABLE III

| OPTICAL TEST RESULTS | | |
|---|---|---|
| Tube type/coating | Slope | Reduction |
| Waspaloy nickel base alloy, 16µ"/none | 0.1203 | — |
| Waspaloy nickel base alloy, 32µ"/none | 0.1111 | — |
| Waspaloy nickel base alloy, 63µ"/none | 0.1008 | — |
| Inconel 625 nickel base alloy, 32µ"/none | 0.1918 | — |
| Waspaloy nickel base alloy, 32µ"/$SiO_2$ sput. | 0.1350 | 21.5% inc |
| Inconel nickel base alloy, 32µ"/$SiO_2$ sput. | 0.1340 | 30.1% |
| Waspaloy nickel base alloy, 32µ"/$WS_2$ | 0.0675 | 39.0% |

TABLE III-continued

| OPTICAL TEST RESULTS | | |
|---|---|---|
| Tube type/coating | Slope | Reduction |
| Waspaloy nickel base alloy, 63µ"/Au | 0.0691 | 37.6% |

The deposit rate reduction for the Inconel 625 nickel base alloy 32 microinch surface finish, with a sputtered silica coating was 30%, but for a Waspaloy nickel base alloy, 32 microinch surface finish with the same coating, an increase in deposit rate of 21.5% was obtained. It was also noted that the deposit rates (slopes) for both were nearly identical, indicating that during sputtering catalytic impurities were introduced to both coatings, causing deposit to form at the same rate on both tubes. Accordingly, these results were not considered indicative of silica coating performance.

The tungsten disulfide coated Waspaloy nickel base alloy, 32 microinch surface finish, and the gold plated Waspaloy nickel base alloy, 63 microinch surface finish tubes provided deposition rate reductions of 39% and 37.6%, respectively. The gold surface was considered to present questions of long term durability, however, as well as expense, and was dropped from further consideration.

While the light reflective mechanism of the above tests provides a good means for the determination of time to on-set of coke deposition, and deposition rate, it is also desirable to know what the long term deposition rate is. Therefore, using the same Jet Fuel Thermal Oxidation Tester conditions, but with the Remote Probe Tube Deposit Rater removed, a gravimetric analysis was made of a series of tests at 4, 8, 16, and 24 hours. The tube weight gains were evaluated for both amount and reproducibility.

In the first series of the gravimetric tests, a Hot Liquid Process Simulator, an expanded capacity Oxidation Tester, was utilized. Uncoated Waspaloy nickel base alloy, 32 microinch surface finish tubes were run to established a new coke deposition baseline. As shown in Table IV, the tungsten disulfide coated Waspaloy nickel base alloy, 32 microinch surface finish tube produced an average weight reduction of 87%.

During a subsequent test run using a TMOS silica coated tube, the Hot Liquid Process Simulator pump failed, necessitating resumption of testing on the original Jet Fuel Thermal Oxidation Tester. After running an uncoated Waspaloy nickel base alloy, 32 microinch surface finish tube to establish a new baseline, additional coated tubes were run on TMOS silica coated Waspaloy nickel base alloy 16 microinch, 32 microinch, and 63 microinch finish surface tubes. Results are set forth in Table IV.

TABLE IV

| GRAVIMETRIC TEST RESULTS | | |
|---|---|---|
| Tube type/coating | Deposit | Reduction |
| Waspaloy nickel base alloy, 32µ"/uncoated | 5.330 mg | — |
| Waspaloy nickel base alloy, 32µ"/$WS_2$ | 0.680 mg | 87.2% |
| Waspaloy nickel base alloy, 32µ"/uncoated | 0.950 mg | — |
| Waspaloy nickel base alloy, 16µ"/TMOS $SiO_2$ | 0.775 mg | 18.4% |
| Waspaloy nickel base alloy, 32µ"/TMOS $SiO_2$ | 0.705 mg | 25.8% |
| Waspaloy nickel base alloy, 63µ"/TMOS $SiO_2$ | 1.070 mg | 12.6% inc |

The tungsten disulfide coated 32 microinch Waspaloy nickel base alloy showed a large reduction in coke deposition. The TMOS silica coated Waspaloy nickel base alloy yielded significant reductions in coke deposition on both the 16 microinch and 32 microinch surface finishes, while the TMOS silica coated Waspaloy nickel base alloy with the 63 microinch surface finish showed an increase in coke deposition.

EXAMPLE 4

Considering these results, the same coatings were tested to determine their ability to promote the gasification of coke deposits under conditions similar to those thought to exist in an operating engine between augmentation cycles, i.e. after shutdown of the afterburners. If such were the case, and the specific coating did not permit a greater coke deposition rate than did the Waspaloy nickel base alloy, then the initial deposits which did from might be removed during higher temperature periods when the augmentor was shut down. If the removal rate were great enough, then deposits would be removed almost as they formed.

To do this, a furnace was set up with a nitrogen purge to reduce the air content to approximate that existing in the spray ring area after augmentor cancellation. Blank and coated Waspaloy nickel base alloy Jet Fuel Thermal Oxidation Tester tubes which had been previously coked as in Example 3 were placed in the furnace and heated to 1050° F. for two hours. Weight changes were recorded, but apparently substrate oxidation weight gains offset some weight loss from coke gasification, as apparent from examination of the tubes under magnification. The uncoated (blank) tubes had lost some, but very little, deposit. The coated tubes ranked as set forth in Table V with respect to the reduction of coke deposit.

TABLE V

| DEPOSIT LOSS | |
| --- | --- |
| Coating type | Reduction |
| Tungsten Disulfide | 30% |
| Sol gel alumina | 90% |
| TMOS silica | 100% |

These results are indicative that even if small coke deposits occur during augmentation cycling, those deposits may be gasified during the "off" cycle of the augmentor, if the augmentor surface is protected by a coating of tungsten disulfide.

EXAMPLE 5

Based upon the above results, special liquid/vapor phase reactors were constructed to enable evaluation of several alloy types and candidate coatings for their fuel deposit buildup tendencies. The reactors were designed so that the coking variables, i.e. temperature, time, fuel composition, oxygen availability, and plumbing material, could be controlled and varied to simulate conditions as desired.

The reactors comprised a Pyrex glass test tube closely fitted within a stainless steel tube with Swagelok ® stainless steel end caps. A two way valve permitted introduction of desired atmospheres and pressure, through a drilled and back welded twelve inch length of stainless steel tubing. The top reactor fitting permitted disassembly of the reactor for cleaning and loading of new test materials. A two way valve was used to control flow of fuel and atmosphere. The Pyrex glass tube was utilized to minimize contact of the fuel and its vapor with the metallic reactor walls, ensuring that results were representative of coking on the test washers only. The test washers were hung in the vapor space of the reactor from a type 316 stainless steel tube, bent to suspend and keep separated a blank or uncoated Waspaloy nickel base alloy washer and the washer being tested. In this way, any slight variations during the coking test would be negated, since both the control and test washers would be affected equally. Test temperatures were controlled by placing the reactors in a heated aluminum block, controlled at plus or minus 2° F. of the desired temperature. Test washers were $\frac{3}{8}$ inch diameter, with a $\frac{1}{4}$ inch hole in the center. Test washers were coated as set forth below, and were tested against uncoated, or "blank" washers to determine effectiveness of the coatings applied.

Coatings of tungsten disulfide were applied to test washers using an air blast gun, at 120 psi, with the gun located 10 to 12 inches from the test parts, resulting in a monolayer thickness of from about 0.000015 to about 0.000020 inches.

Test washers were coated with mixed alumina-silica sol gels by a procedure comprising dipping the washer in the sol and air drying, for four applications of sol. Two sets of dipping and drying were performed, with a five hour firing at 1112° F. conducted between the sets. Two different sol gels were applied to independent test washers for evaluation. The first sol gel, designated AP5, comprised 60.5 parts methyl alcohol, 30.3 parts silica sol, and 9.1 parts aluminum sec-butoxide sol. The second sol, designated AP7, comprised 78.3 parts methyl alcohol, 4.4 parts silica sol, and 17.3 parts aluminum sec-butoxide sol.

The amount of fuel chosen for use in the tests and the size of the reactors were based upon the estimated residual fuel left in an augmentor spray manifold of a military aircraft engine augmentor after shutdown, and the spray manifold total internal volume. The Number 3 spray manifold was chosen since it was known to have the most severe coking problem for the specific engine being simulated. The residual fuel volume to vapor space volume was estimated to be 1:7.5. Accordingly, the fuel volume used in these tests was 10 ml, and the reactor vapor space volume was about 75 ml, to simulate actual engine conditions.

In order to approximate the cycling of an augmentor, the time at temperature for the reactors was cycled. Three 1.5 hour cycles were used. At the end of each cycle, the reactors were weighed, rapidly cooled in water, depressurized, repressurized with 30 psig air, and replaced in the heated block. After the third cycle, the reactors were opened and the test washers were dried at 230° F. for 15 minutes. The washers were then weighed to determine the percentage increase or decrease relative to the blank Waspaloy nickel base alloy washer.

The tests were conducted at 550° F., and air pressure of 30 psig. Air pressures above this caused auto-ignition of the fuel, evidenced by copious sooting within the reactors, at 550° F. and above. Pressures below this value produced incrementally lower deposit weights, so to obtain measurable deposit weights within a reasonable time, the 30 psig pressure was selected. The test fuel used was JP-4, taken from a single two gallon sample stored at room temperature.

In addition to measuring coke deposition on the test washers, a second test was conducted to determine whether the coating applied to the washer possessed the ability to reduce the temperature of carbon burnoff relative to Waspaloy nickel base alloy. For this test, the burnoff temperature and the amount of deposited carbon were determined by use of a LECO Model RC412 Multiphase Carbon Determinator. An air combustion atmosphere was used rather than oxygen, to simulate actual flying conditions. Test results are as set forth in Table VI, below. Since the LECO carbon analysis confirmed the gravimetric results, only the Leco carbon result is given for percent change in coking.

TABLE VI

| CARBON DEPOSITION AND BURNOFF | | |
|---|---|---|
| Surface | Change | Burnoff Temp. |
| Waspaloy nickel base alloy, uncoated | — | 930° F. |
| Tungsten disulfide | +25% | 918° F. |
| AP5 Alumina-silica | −14% | 925° F. |
| AP7 Alumina-silica | −19% | 940° F. |

These results indicate that protective surface coatings may be applied to fuel contacting elements to either inhibit carbon deposition and coking, or to enhance the burnoff of such coke as is deposited. It may also be seen from the results shown in Examples 1 through 3 that as the surface chemical reactivity (i.e. catalytic nature), roughness, and/or porosity, of the substrate increases, one may anticipate increased carbon deposition.

It is to be understood that the above description of the present invention is subject to considerable modification, change, and adaptation by those skilled in the art to which it pertains, and that such modifications, changes, and adaptations are to be considered within the scope of the present invention, which is set forth by the appended claims.

What is claimed is:

1. A method for the inhibition of coking on a hydrocarbon fuel contacting element of a gas turbine engine, said method comprising applying an adherent layer of tungsten disulfide to the surface of said element.

2. The method of claim 1, wherein said element comprises a material selected from the group consisting of titanium, titanium alloys, aluminum, stainless steel, and nickel base superalloys.

3. The method of claim 2, wherein said tungsten disulfide is applied by means of an air blast gun.

4. The method of claim 3, wherein said layer of tungsten disulfide is from about 0.000010 inches to about 0.000030 inches in thickness.

5. The method of claim 4, wherein said layer of tungsten disulfide is from about 0.000015 inches to about 0.000020 inches in thickness.

6. A method for reducing carbon deposition on alloys in the combustion zone of a gas turbine engine, said alloys being selected from the group consisting of titanium, titanium alloys, aluminum, stainless steel, and nickel base superalloys, said method comprising applying to said alloys a layer of tungsten disulfide.

7. The method of claim 6, wherein said layer of tungsten disulfide is from about 0.000010 inches to about 0.000030 inches in thickness.

8. The method of claim 7, wherein said layer of tungsten disulfide is from about 0.000015 inches to about 0.000020 inches in thickness.

9. A method for the protection of a gas turbine element from coking, comprising applying to the surface of said element a monomolecular layer of tungsten disulfide, said layer being from about 0.000015 inches to about 0.000020 inches in thickness.

10. The method of claim 9, wherein said element comprises a material selected from the group consisting of titanium, titanium alloys, aluminum, stainless steel, and nickel base superalloys.

11. The method of claim 10, wherein said tungsten disulfide is applied by means of an air blast gun.

* * * * *

UNITED STATES PATENT AND TRADEMARK OFFICE
CERTIFICATE OF CORRECTION

PATENT NO. : 5,240,741
DATED : August 31, 1993
INVENTOR(S) : William H. Edwards III et al It is certified that error appears in the above-identified patent and that said Letters Patent is hereby corrected as shown below:

Column 3, line 32, change "comprises" to --comprise--
Column 3, line 34, change "Inconel nickel base alloys" to --Inconel nickel base alloy--
Column 3, line 36, change "one" to --on--
Column 6, line 41, change "established" to --establish--
Column 7, line 18, change "from" to --form--

Signed and Sealed this

Twenty-eighth Day of June, 1994

Attest:

BRUCE LEHMAN

Attesting Officer   Commissioner of Patents and Trademarks